(12) United States Patent
Inomata et al.

(10) Patent No.: US 10,546,407 B2
(45) Date of Patent: Jan. 28, 2020

(54) INFORMATION PROCESSING METHOD AND SYSTEM FOR EXECUTING THE INFORMATION PROCESSING METHOD

(71) Applicant: COLOPL, Inc., Tokyo (JP)

(72) Inventors: Atsushi Inomata, Kanagawa (JP); Kento Nakashima, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/881,934

(22) Filed: May 6, 2018

(65) Prior Publication Data

US 2018/0300926 A1    Oct. 18, 2018

(30) Foreign Application Priority Data

Jan. 30, 2017 (JP) .................................. 2017-014585

(51) Int. Cl.
*G09G 5/00* (2006.01)
*G06T 13/40* (2011.01)
(Continued)

(52) U.S. Cl.
CPC ............ *G06T 13/40* (2013.01); *A63F 13/212* (2014.09); *A63F 13/213* (2014.09);
(Continued)

(58) Field of Classification Search
CPC ....... G06T 13/40; G06T 15/20; A63F 13/213; A63F 2300/5553; A63F 13/428; A63F 13/212; G06F 3/013; G06F 3/012
See application file for complete search history.

(56) References Cited

U.S. PATENT DOCUMENTS

2008/0119285 A1   5/2008 Yamashita
2010/0097375 A1*  4/2010 Tadaishi ................. G06T 17/00
                                                    345/420
(Continued)

FOREIGN PATENT DOCUMENTS

JP   2000-244886 A    9/2000
JP   2008-125550 A    6/2008
(Continued)

OTHER PUBLICATIONS

Facebook Mark Zuckerberg Social VR Demo OC3 Oculus Connect 3 Keynote, Online, Oct. 6, 2016, VRvibe, Searched Dec. 5, 2016, retrieved Jan. 24, 2018, https://www.youtube.com/watch?v=NCpNKLXovtE, 4pp.

(Continued)

*Primary Examiner* — Adam R. Giesy
(74) *Attorney, Agent, or Firm* — Hauptman Ham, LLP

(57) ABSTRACT

A method includes defining a virtual space including includes a first avatar object associated with a first user. The first avatar object includes a first part and a second part. The method includes moving the first avatar object in response to a first input from the first user. The first input includes a first motion information for identifying a motion of a part of a body of the first user, and the first part of the first avatar object is moved in accordance with the first motion information. The method includes acquiring supplementary information, independent of a detected movement of the first user, for defining a motion of the second part. The method includes moving the second part based on the supplementary information. The method includes identifying a visual field in the virtual space of a second user different from the first user. The method includes generating a visual-field image.

20 Claims, 19 Drawing Sheets

(51) Int. Cl.
   *G06F 3/01*      (2006.01)
   *A63F 13/428*    (2014.01)
   *A63F 13/212*    (2014.01)
   *A63F 13/213*    (2014.01)
   *G06T 15/20*     (2011.01)

(52) U.S. Cl.
   CPC ............ *A63F 13/428* (2014.09); *G06F 3/012* (2013.01); *G06F 3/013* (2013.01); *G06T 15/20* (2013.01)

(56) References Cited

U.S. PATENT DOCUMENTS

2012/0040759 A1   2/2012   Ito et al.
2012/0295708 A1*  11/2012  Hernandez-Abrego ............... G06F 3/167 463/36
2015/0163473 A1   6/2015   Osawa et al.

FOREIGN PATENT DOCUMENTS

| JP | 2012-50804 A   | 3/2012  |
| JP | 2014-17776 A   | 1/2014  |
| JP | 2014-161723 A  | 9/2014  |
| JP | 2016-202686 A  | 12/2016 |

OTHER PUBLICATIONS

Office Action in JP Application No. 2017-014585, dated Aug. 1, 2017, 8pp.
Office Action in JP Application No. 2017-014585, dated Nov. 17, 2017, 8pp.

* cited by examiner

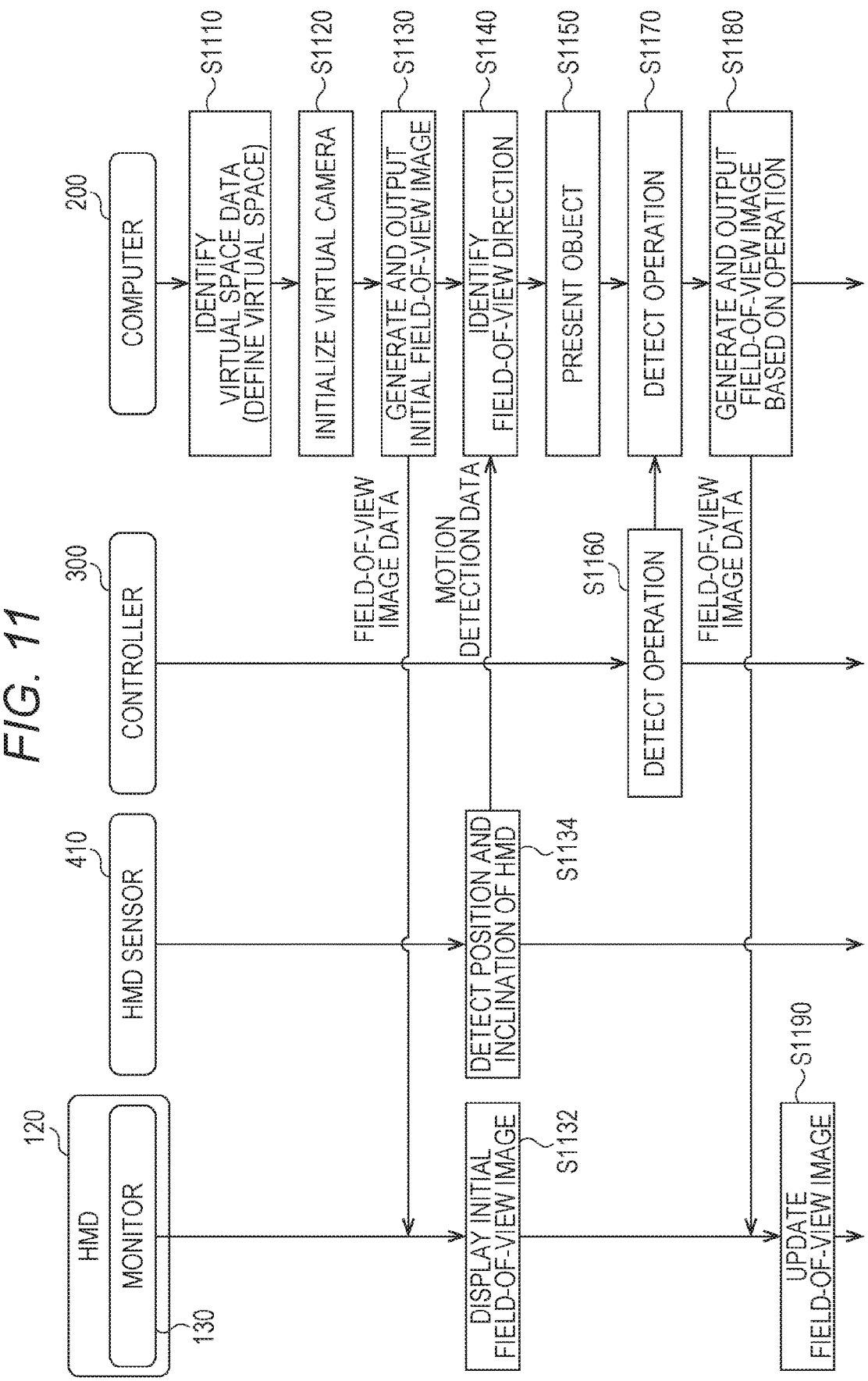

INFORMATION PROCESSING METHOD AND SYSTEM FOR EXECUTING THE INFORMATION PROCESSING METHOD

RELATED APPLICATIONS

The present application claims priority to Japanese application No. 2017-014585, filed Jan. 30, 2017, the disclosure of which is hereby incorporated by reference herein in its entirety.

TECHNICAL FIELD

This disclosure relates to a method for processing information and a system for executing the information processing method.

BACKGROUND

In Non-Patent Document 1, there is described a technology of operating, in a virtual space shared by a plurality of users, a character object associated with each user, for example, an avatar, based on an operation by each user. In Patent Document 1, there is described a technology of moving an avatar in a virtual space based on a motion of a body of an actual attendee detected by various sensors.

PATENT DOCUMENTS

[Patent Document 1] JP 2000-244886 A

Non-Patent Documents

[Non-Patent Document 1] "Facebook Mark Zuckerberg Social VR Demo OC3 Oculus Connect 3 Keynote", [online], Oct. 6, 2016, VRvibe, [retrieved on Dec. 5, 2016], Internet <https://www.youtube.com/watch?v=NCpNKLXovtE>

SUMMARY

According to at least one aspect of this disclosure, there is provided a method including defining a virtual space, the virtual space including a first avatar associated with a first user and a second avatar associated with a second user, the second avatar including a first part and a second part. The method further includes moving the first avatar in response to a first input by the first user. The method further includes moving the second avatar in response to a second input by the second user, the second input including second motion information for identifying a motion of a part of a body of the second user, the first part being moved in accordance with the second motion information. The method further includes acquiring supplementary information for defining a motion of the second part. The method further includes moving the second part based on the supplementary information; identifying a visual field in the virtual space of the first user in response to the first input. The method further includes generating a visual-field image corresponding to the visual field.

BRIEF DESCRIPTION OF THE DRAWINGS

FIG. 11 A sequence chart of processing to be executed by a system including an HMD set according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
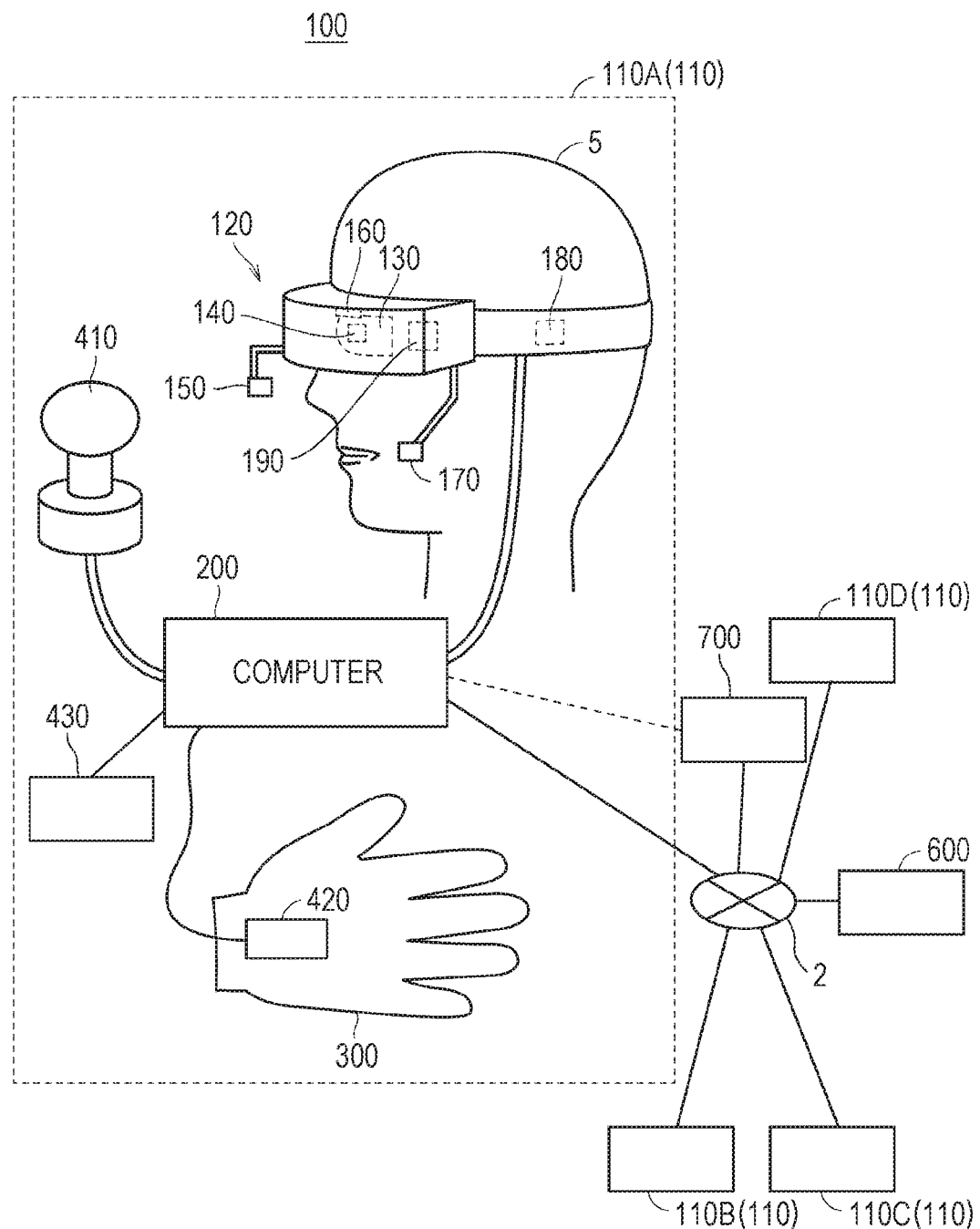
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
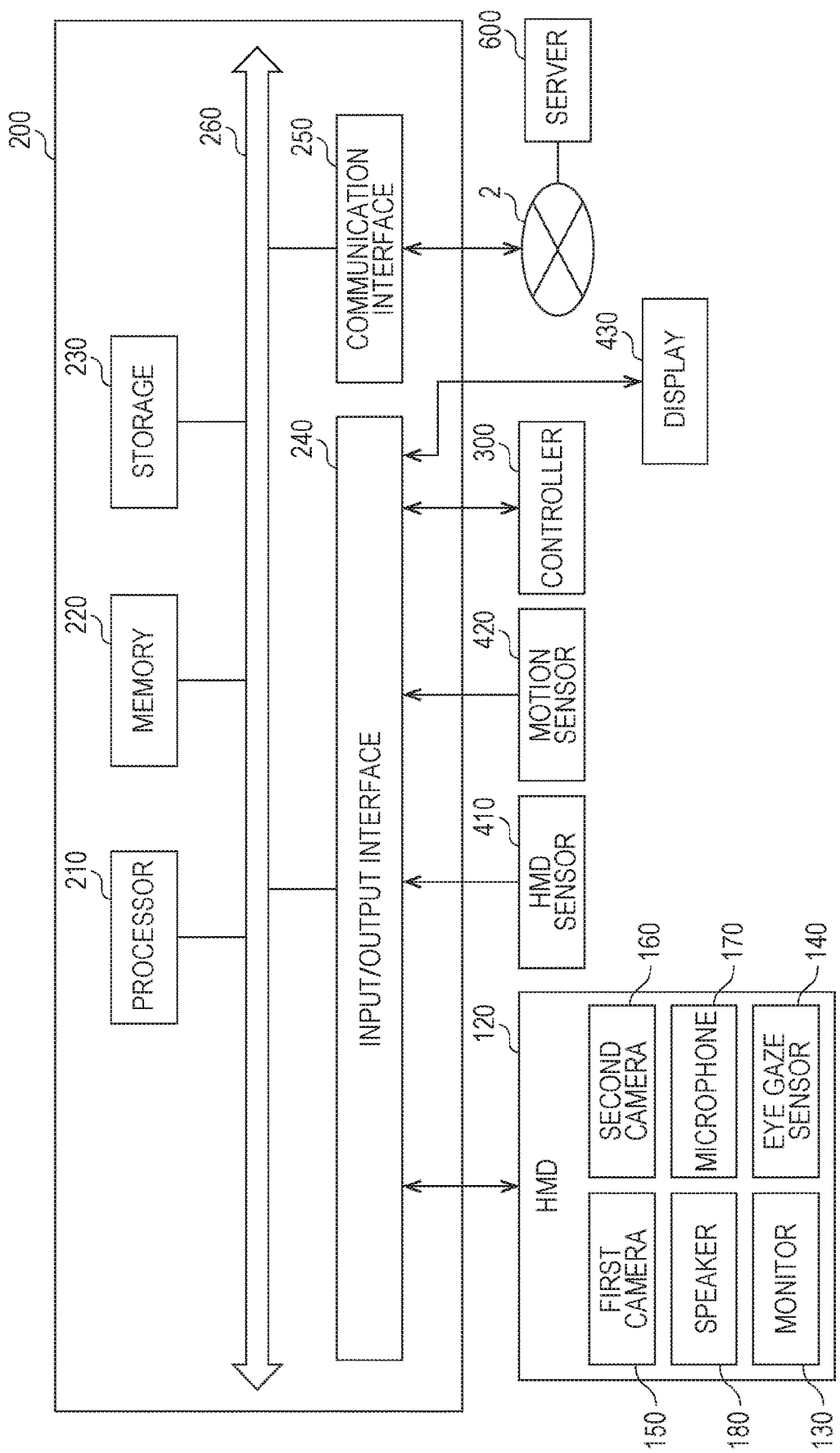
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes anyone of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth (R), near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-field Coordinate System]

Figure 3:
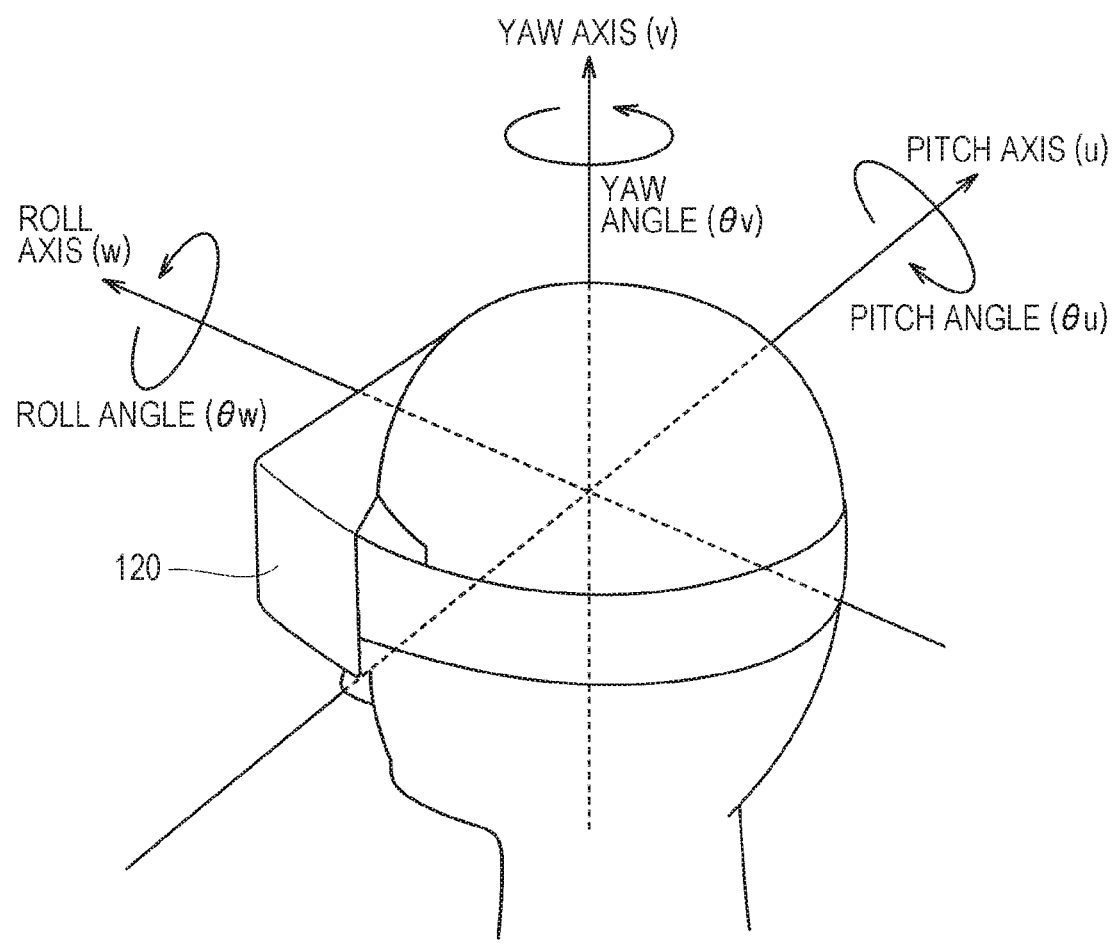
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($\theta u$), a yaw angle ($\theta v$), and a roll angle ($\theta w$) of the HMD 120 in the uvw visual-field coordinate system. The pitch angle ($\theta u$) represents an inclination angle of the HMD 120 about the pitch axis in the uvw visual-field coordinate system. The yaw angle ($\theta v$) represents an inclination angle of the HMD 120 about the yaw axis in the uvw visual-field coordinate system. The roll angle ($\theta w$) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
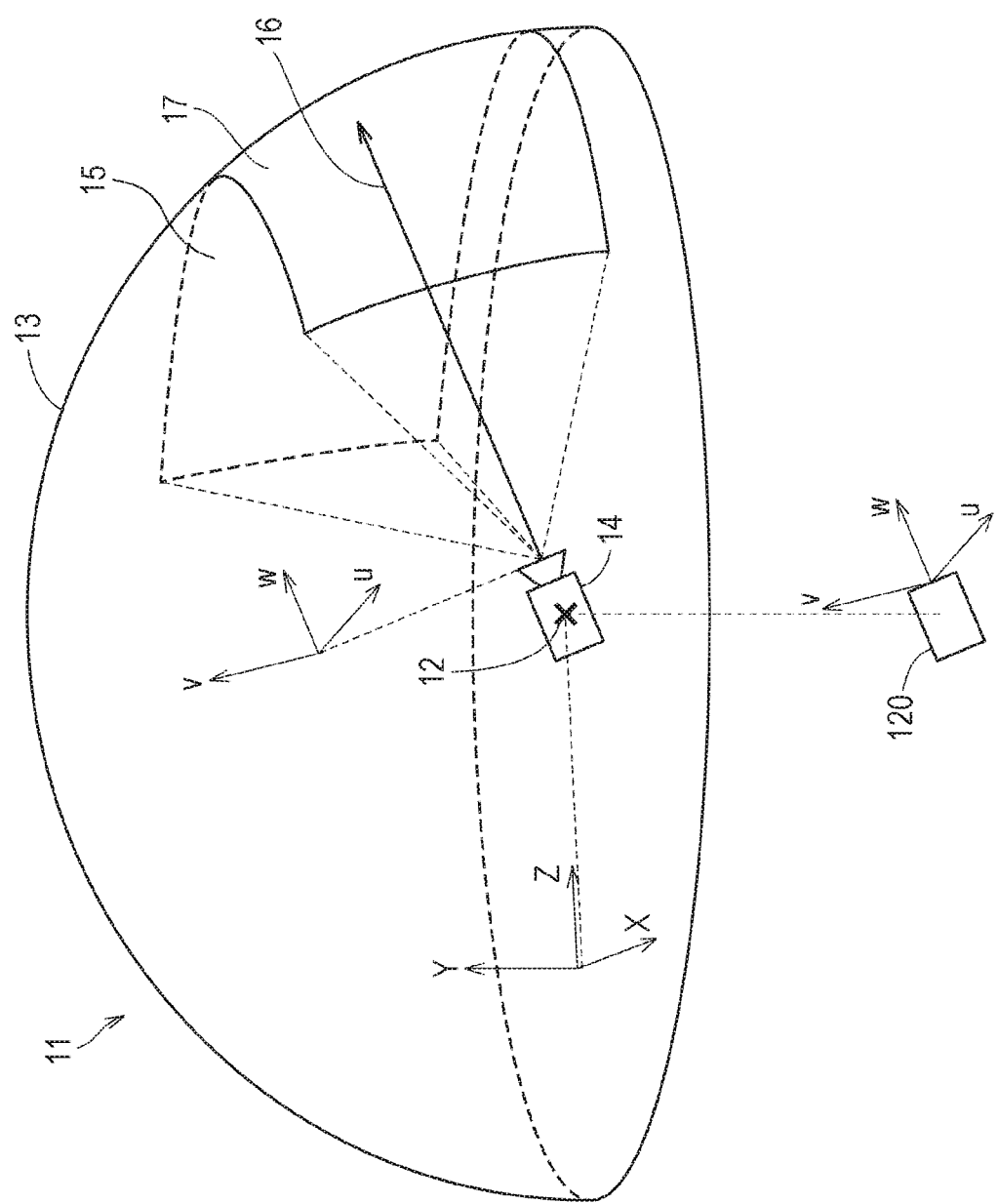
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
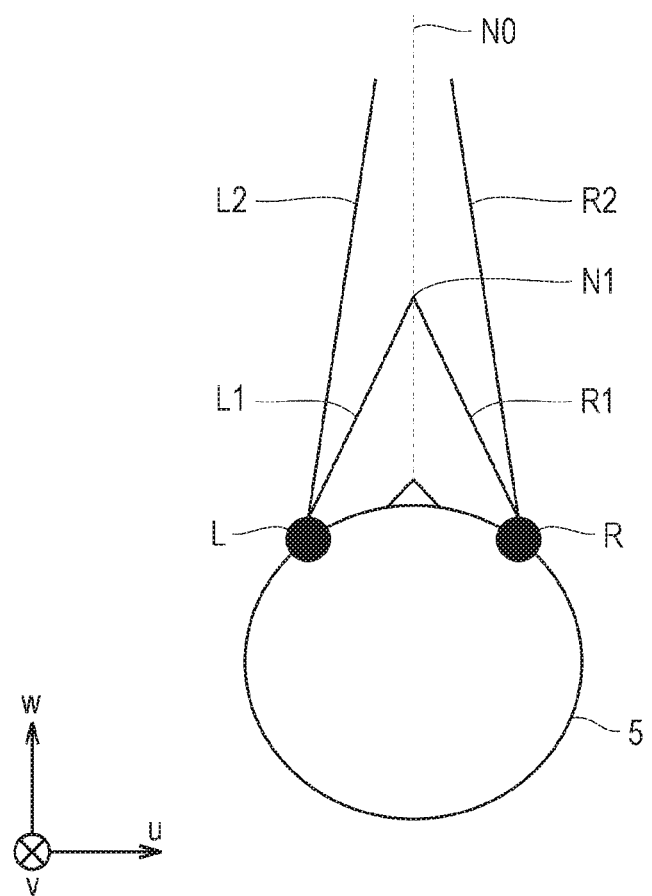
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-view Region]

Figure 6:
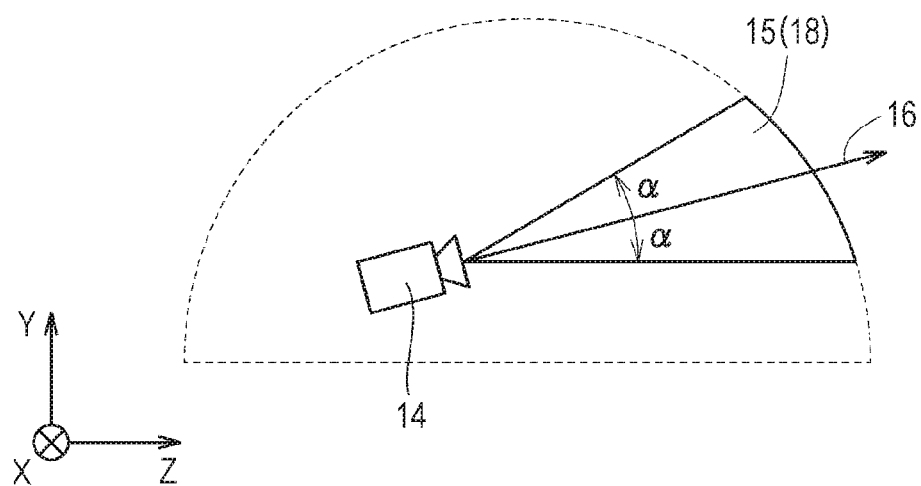
FIG. 6 A diagram of a YZ cross section obtained by viewing a field-of-view region from an X direction in the virtual space according to at least one embodiment of this disclosure.
Figure 7:
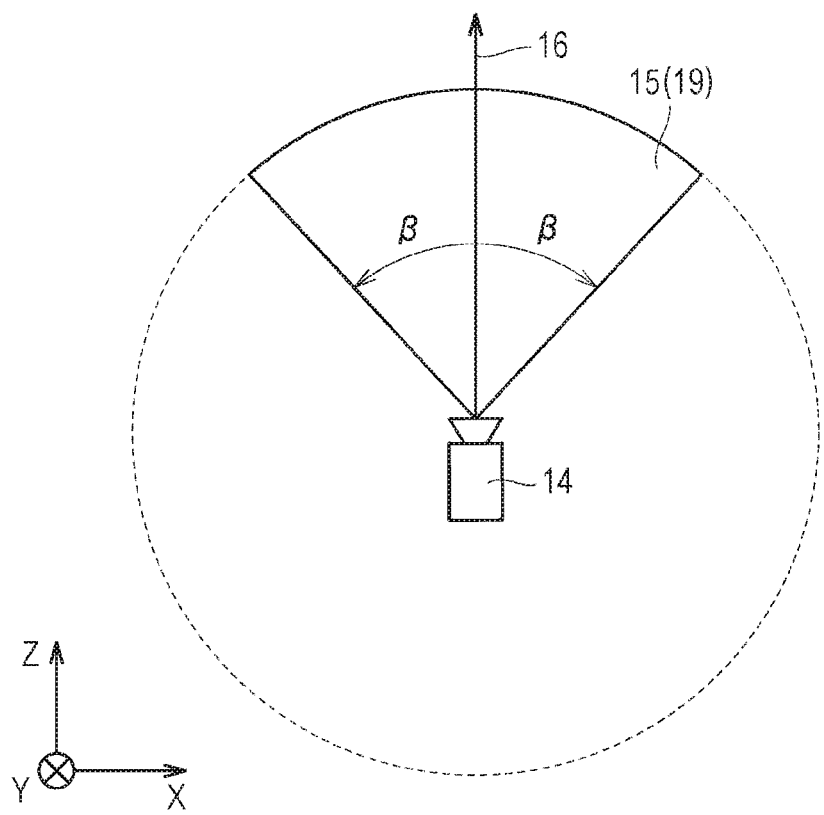
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
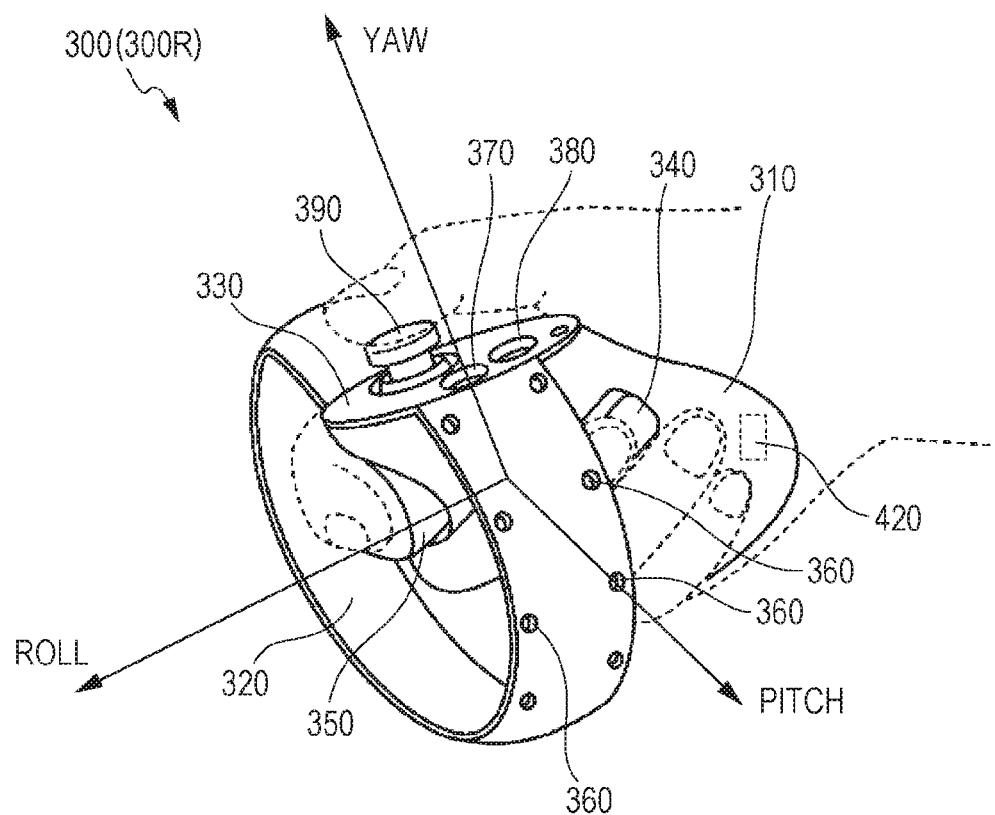
FIG. 8A A diagram of a schematic configuration of a controller according to at least one embodiment of this disclosure.
Figure 8B:
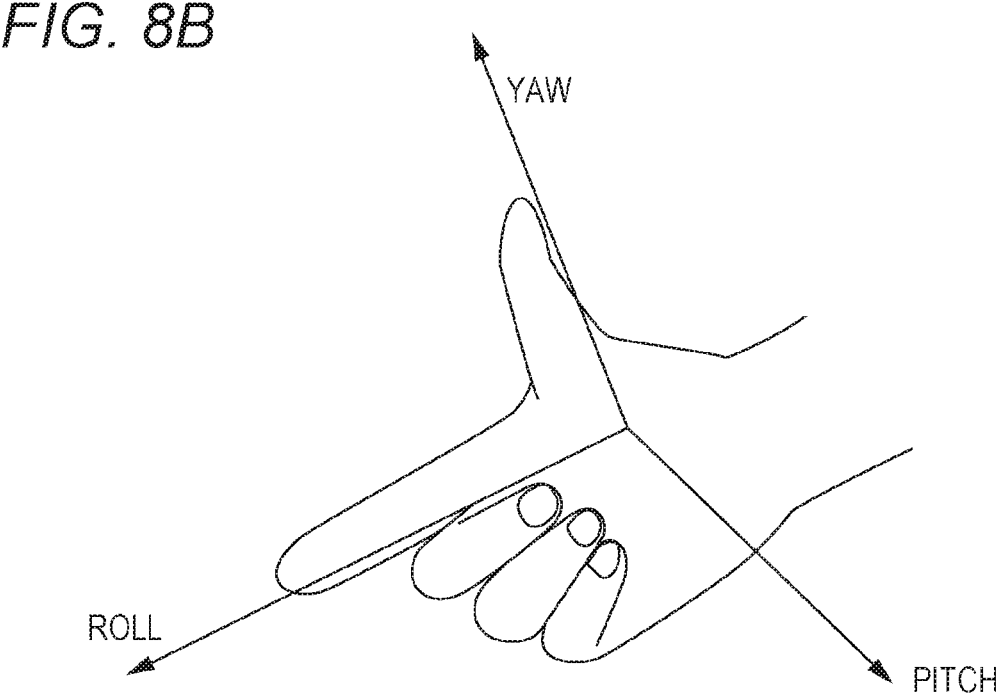
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIGS. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
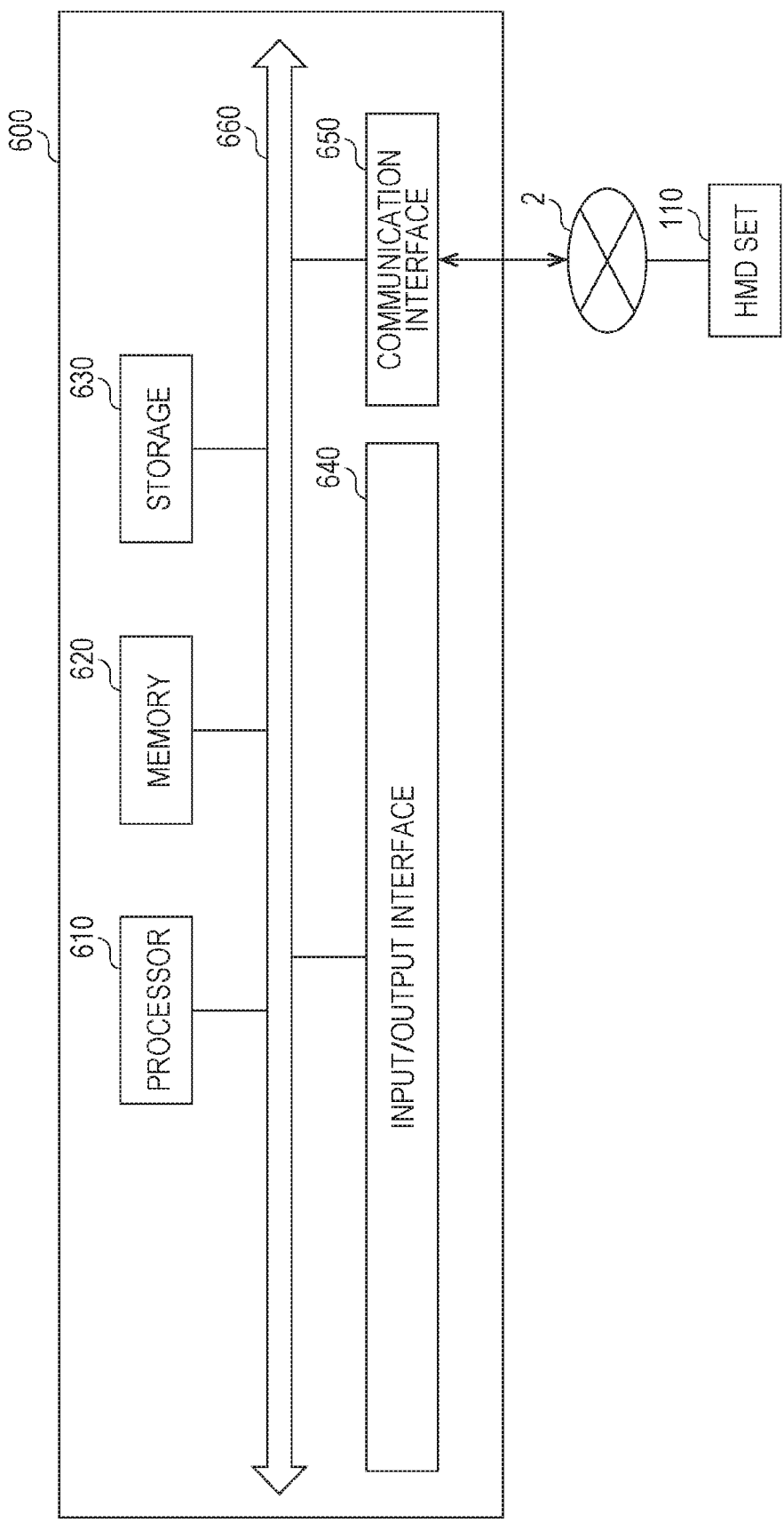
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
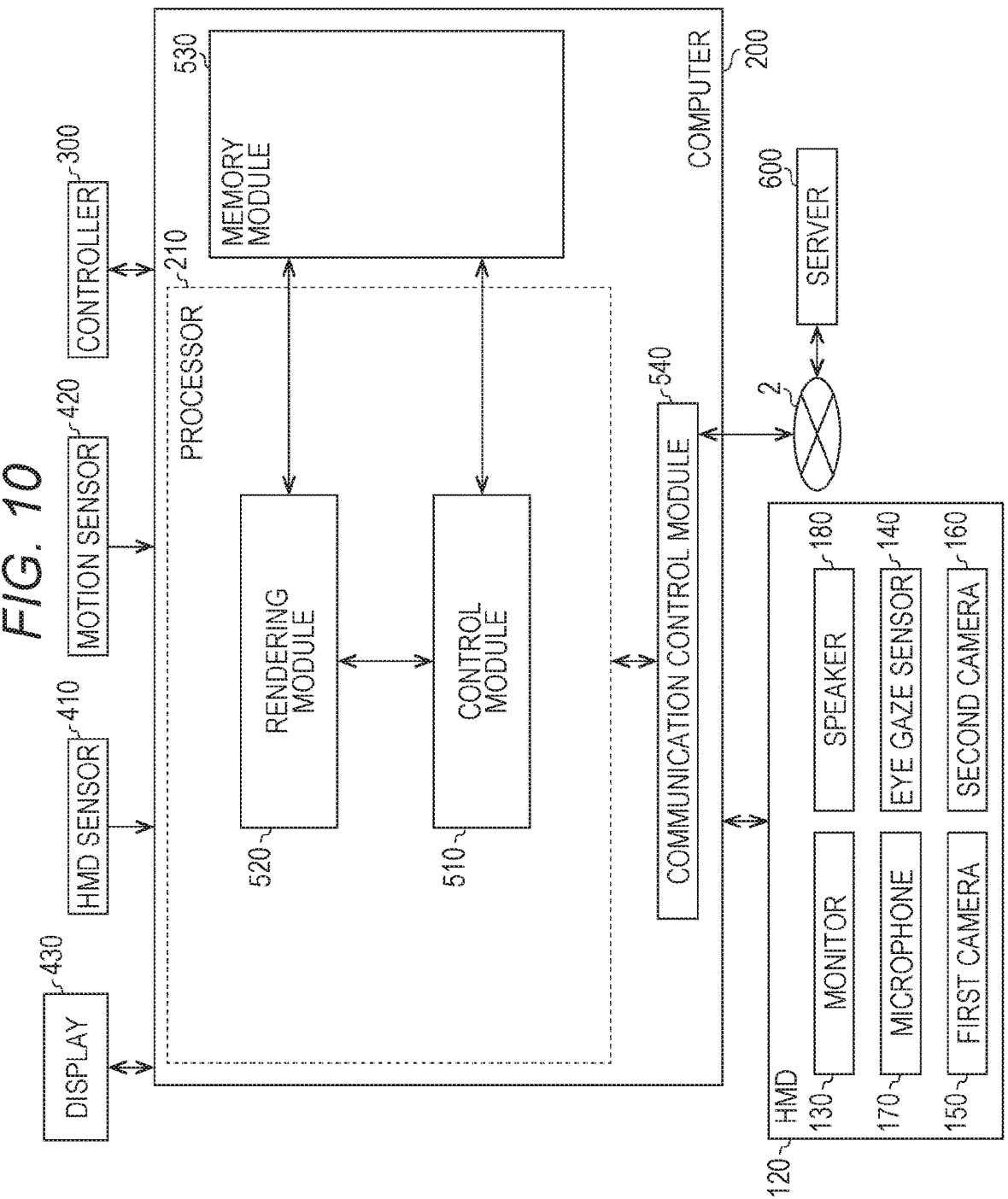
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity (R) provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
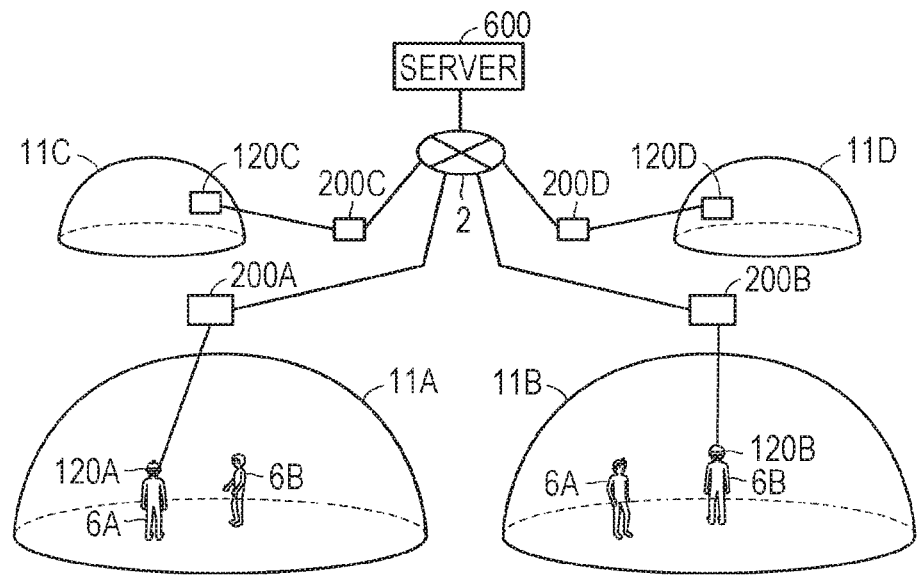
FIG. 12A A schematic diagram of HMD systems of several users sharing the virtual space interact using a network according to at least one embodiment of this disclosure.
Figure 12B:
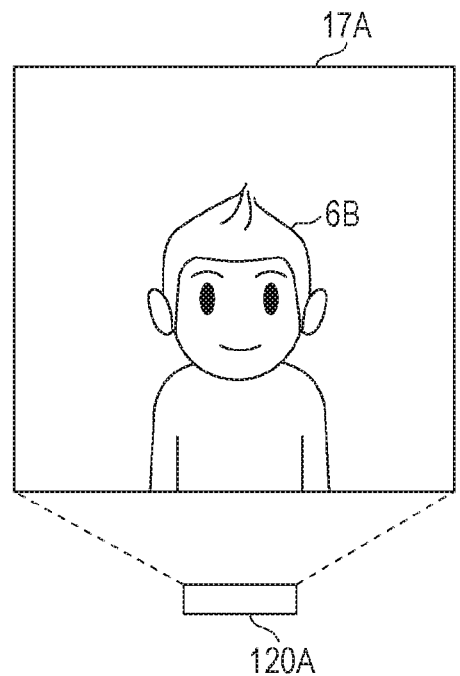
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
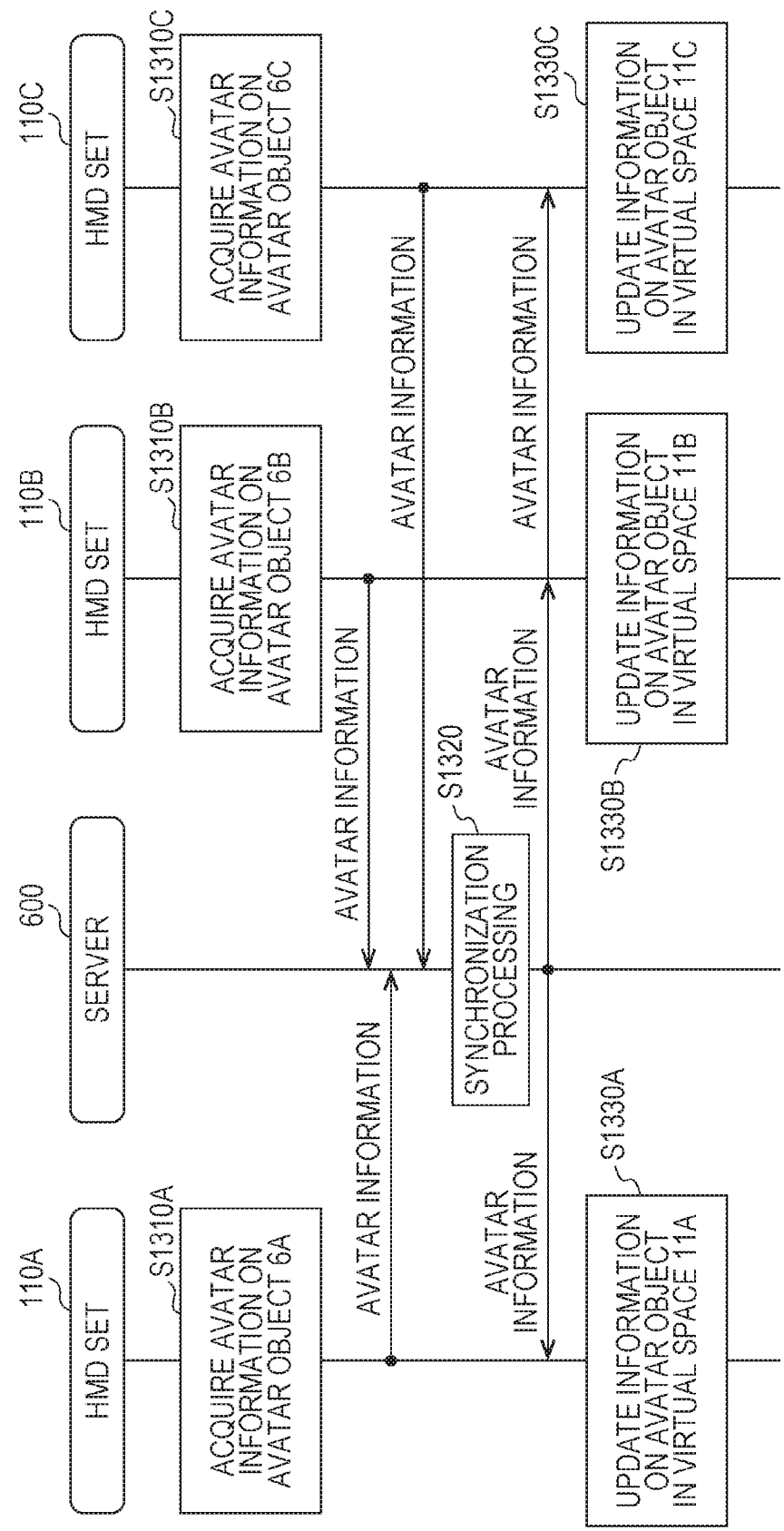
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Details of Module Configuration]

Figure 14:
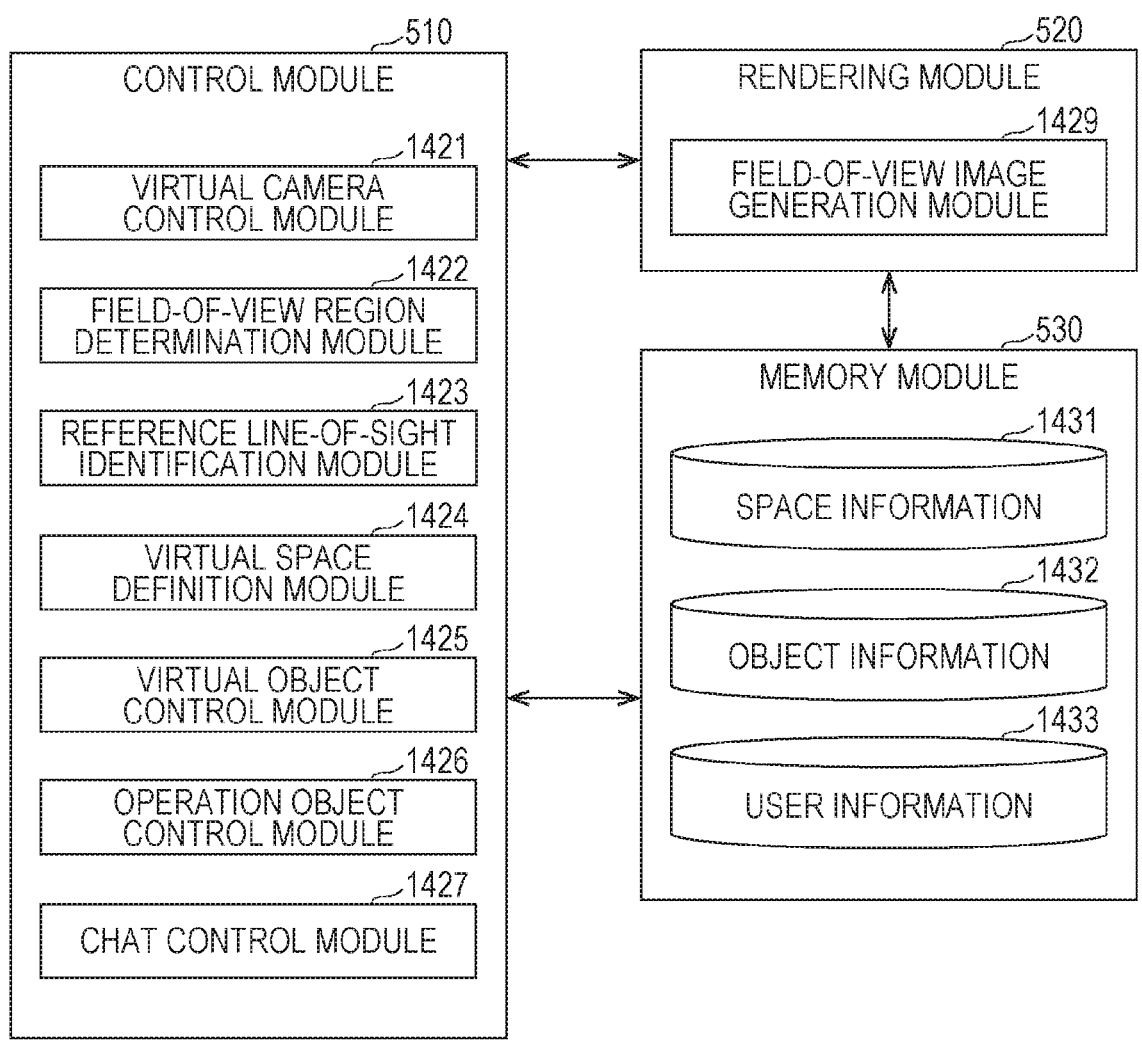
FIG. 14 A block diagram of a configuration of modules of a computer according to at least one embodiment of this disclosure.

With reference to FIG. 14, a module configuration of the computer 200 is described. FIG. 14 is a block diagram of a configuration of modules of the computer 200 according to at least one embodiment of this disclosure.

In FIG. 14, the control module 510 includes a virtual camera control module 1421, a field-of-view region determination module 1422, a reference-line-of-sight identification module 1423, a virtual space definition module 1424, a virtual object control module 1425, an operation object control module 1426, and a chat control module 1427. The rendering module 520 includes a field-of-view image generation module 1429. The memory module 530 stores space information 1431, object information 1432, user information 1433, and face information 1434.

In at least one aspect, the control module 510 controls display of an image on the monitor 130 of the HMD 120. The virtual camera control module 1421 arranges the virtual camera 14 in the virtual space 11, and controls, for example, the behavior and direction of the virtual camera 14. The field-of-view region determination module 1422 defines the field-of-view region 15 in accordance with the direction of the head of the user wearing the HMD 120. The field-of-view image generation module 1429 generates a field-of-view image to be displayed on the monitor 130 based on the determined field-of-view region 15. Further, the field-of-view image generation module 1429 determines a display mode of a character object (to be described later) to be included in the field-of-view image, for example, an avatar (or player character). The reference-line-of-sight identification module 1423 identifies the line of sight of the user 5 based on the signal from the eye gaze sensor 140. In at least one embodiment, the term "avatar object" is synonymous with the term "avatar".

The control module 510 controls the virtual space 11 to be provided to the user 5. The virtual space definition module 1424 generates virtual space data representing the virtual space 11, to thereby define the virtual space 11 in the HMD set 110.

The virtual object generation module 1425 generates target objects to be arranged in the virtual space 11 based on the object information 1432 to be described later. Further, the virtual object control module 1425 controls the motion (e.g., movements and state changes) of the target object and the avatar in the virtual space 11. The target object may include, for example, a landscape including a forest, a mountain, and other scenery, and an animal to be arranged in accordance with the progress of the game story. The avatar is an object (character object) associated with the user wearing the HMD 120.

The operation object control module 1426 arranges in the virtual space 11 an operation object for operating an object arranged in the virtual space 11. In at least one aspect, the operation object includes, for example, a hand object corresponding to a hand of the user wearing the HMD 120, a finger object corresponding to a finger of the user, and a stick object corresponding to a stick to be used by the user. When the operation object is a finger object, in particular, the operation object corresponds to a portion of the axis in a direction (axial direction) indicated by the finger.

The chat control module 1427 performs control for chatting with an avatar of another user who is in the same virtual space 11. For example, the chat control module 1427 transmits to the server 600 information on the position, direction, and the like of the avatar of the user, and sound data input to the microphone 170. Further, the chat control module 1427 outputs the sound data of another user received from the server 600 to a speaker (not shown). As a result, a sound-based chat is implemented.

The space information 1431 includes one or more templates that are defined to provide the virtual space 11. The object information 1432 includes, for example, content to be played back in the virtual space 11 and information for arranging an object to be used in the content. The content may include, for example, a game or content representing a scenery similar to that of the real society. The object information 1432 also includes rendering information for rendering each object (e.g., target object and avatar). The object information 1432 may also include attribute information representing an attribute associated with each object. Examples of attribute information on the target object include information representing whether the target object is a movable object or a fixed object. Examples of attribute information on the avatar include information representing a role, a level, and the like of the avatar. The user information 1433 includes, for example, a program for causing the computer 200 to function as a control device for the HMD set 110, and an application program that uses each piece of content stored in the object information 1432. Further, the user information 1433 may also include attribute information representing an attribute associated with the user. Examples of attribute information on the user include information representing a title, a role, and the like of the user.

[Control Structure]

Figure 15:
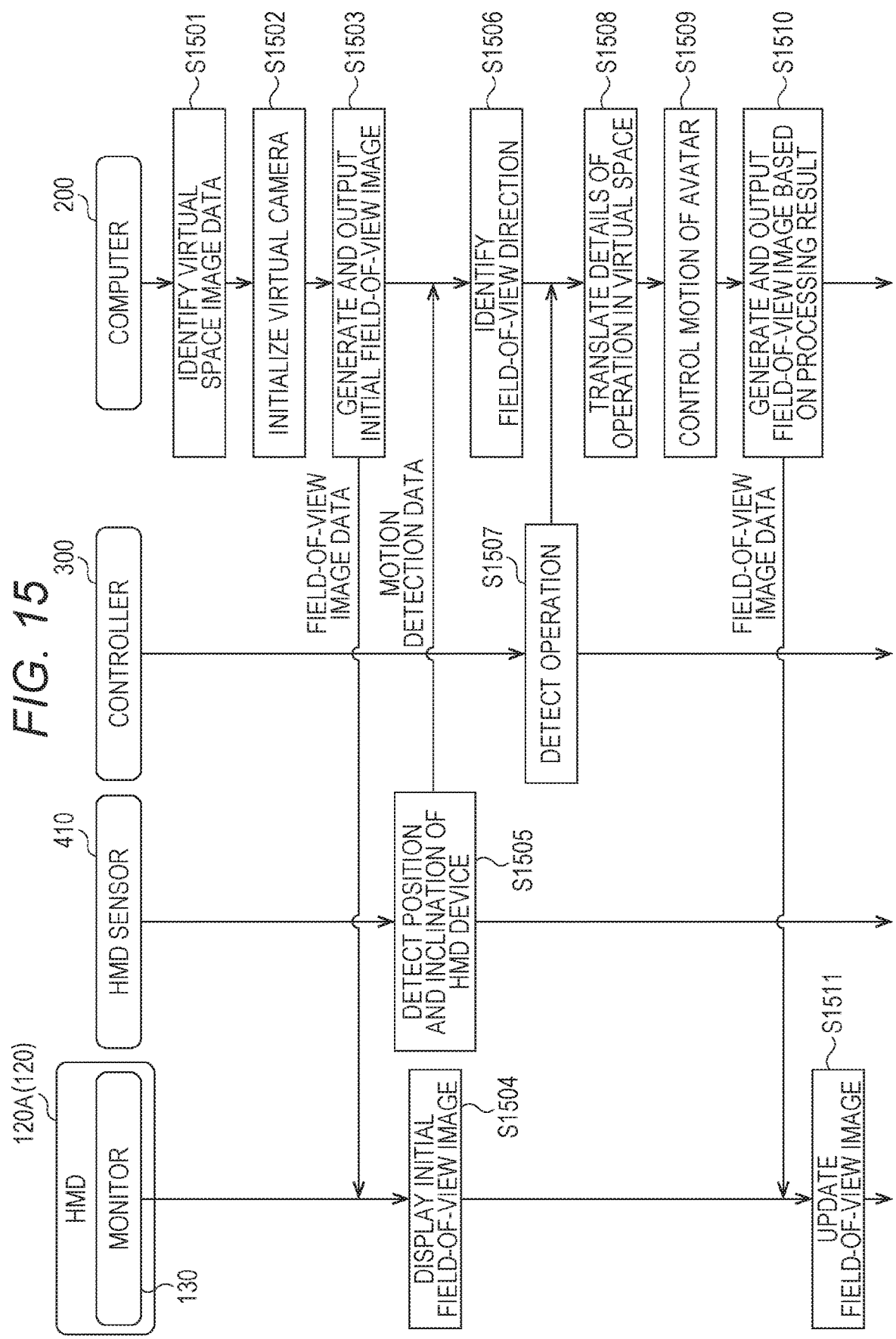
FIG. 15 A flowchart of processing to be executed by an HMD set 110A according to at least one embodiment of this disclosure.

With reference to FIG. 15, the control structure of the computer 200 according to at least one embodiment of this disclosure is described. FIG. 15 is a flowchart of processing to be executed by the HMD set 110A, which is used by the user 5A (first user), to provide the virtual space 11 to the user 5A according to at least one embodiment of this disclosure.

In Step S1501, the processor 210 of the computer 200 serves as the virtual space definition module 1424 to identify virtual space image data and define the virtual space 11.

In Step S1502, the processor 210 serves as the virtual camera control module 1421 to initialize the virtual camera 14. For example, in a work area of the memory, the processor 210 arranges the virtual camera 14 at the center defined in advance in the virtual space 11, and matches the line of sight of the virtual camera 14 with the direction in which the user 5 faces.

In Step S1503, the processor 210 serves as the field-of-view image generation module 1429 to generate field-of-view image data for displaying an initial field-of-view image. The generated field-of-view image data is transmitted to the HMD 120 by the communication control module 540 via the field-of-view image generation module 1429.

In Step S1504, the monitor 130 of the HMD 120 displays a field-of-view image based on a signal received from the computer 200. The user 5 wearing the HMD 120 may recognize the virtual space 11 through visual recognition of the field-of-view image.

In Step S1505, the HMD sensor 410 detects the position and inclination of the HMD 120 based on a plurality of infrared rays emitted from the HMD 120. The detection results are transmitted to the computer 200 as motion detection data.

In Step S1506, the processor 210 serves as the field-of-view region determination module 1422 to identify a field-of-view direction of the user 5 wearing the HMD 120 based on the position and inclination of the HMD 120. The processor 210 executes an application program, and arranges an object in the virtual space 11 based on a command contained in the application program.

In Step S1507, the controller 300 detects an operation performed by the user 5 in the real space. For example, in at least one aspect, the controller 300 detects that a button has been pressed by the user 5. In at least one aspect, the controller 300 detects a motion of both hands of the user 5 (e.g., waving both hands). A signal indicating details of the detection is transmitted to the computer 200.

In Step S1508, the processor 210 serves as the operation object control module 1426 to translate in the virtual space 11 the details of the detection transmitted from the controller 300. Specifically, the processor 210 moves the operation object (e.g., hand object representing the hand of the avatar) in the virtual space 11 based on a signal indicating the details of the detection. The processor 210 serves as the operation object control module 1426 to detect an operation (e.g., grip operation) determined in advance on the target object by the operation object.

In Step S1509, the processor 210 serves as the virtual object control module 1425 to control the motion of respective avatar objects associated with the users 5A to 5C. Specifically, the processor 210 acquires the motion information on the users 5A to 5C sharing the virtual space 11. In this case, the motion information on the other users 5B and 5C is included in information (player information to be described later) transmitted from the HMD sets 110B and 110C used by the other users 5B and 5C. On the basis of the motion information or the like, the processor 210 determines the motion of each avatar (i.e., display manner of animation or the like in the field-of-view image provided to each user).

In Step S1510, the processor 210 serves as the field-of-view image generating module 1429 to generate field-of-view image data for displaying a field-of-view image based on the results of the processing in Step S1508 and Step S1509, and output the generated field-of-view image data to the HMD 120.

In Step S1511, the monitor 130 of the HMD 120 updates a field-of-view image based on the received field-of-view image data, and displays the updated field-of-view image.

Figure 16:
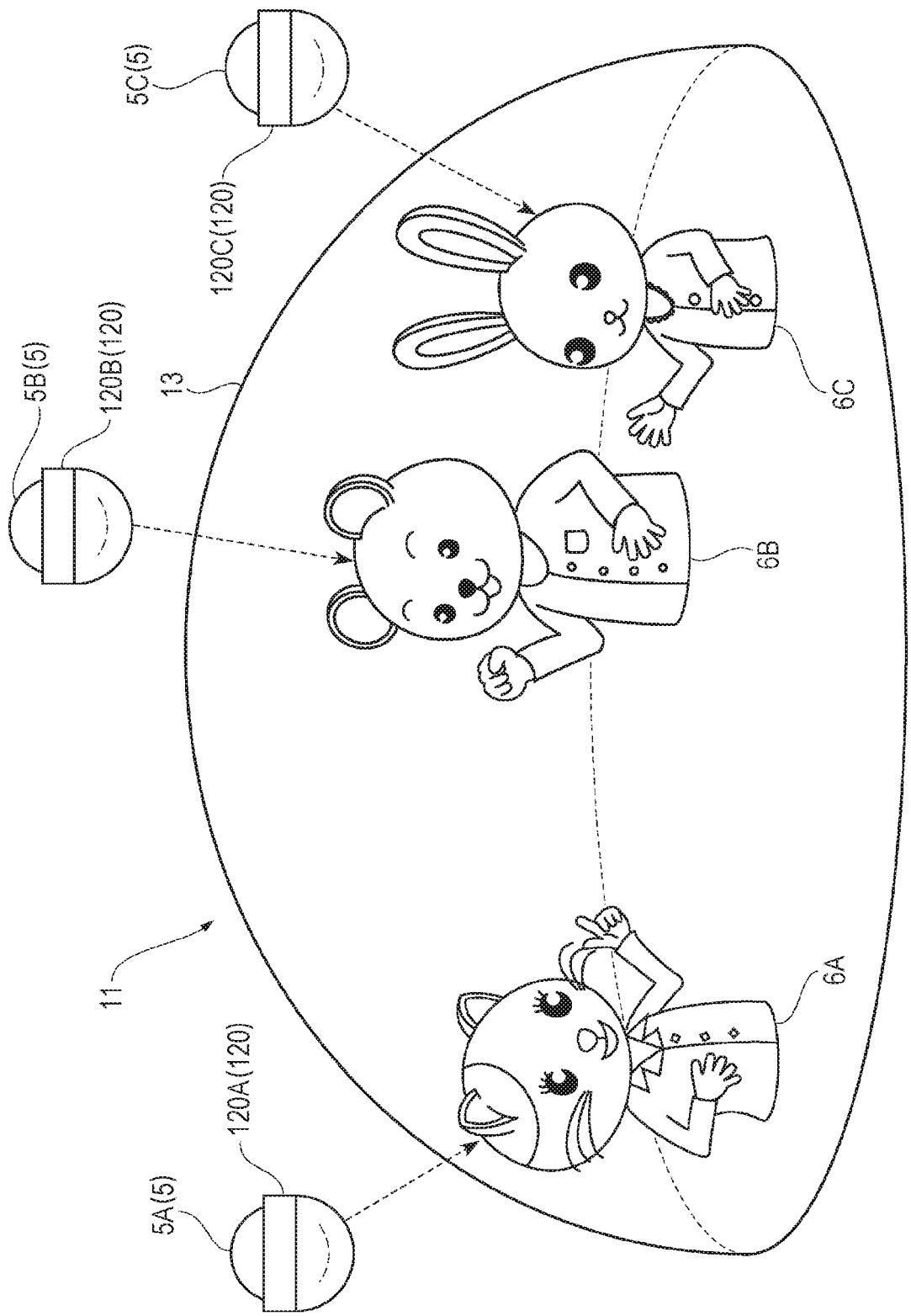
FIG. 16 A schematic diagram of a virtual space shared by a plurality of users according to at least one embodiment of this disclosure.

FIG. 16 is a schematic diagram of the virtual space 11 shared by a plurality of users according to at least one embodiment of this disclosure. In FIG. 16, the avatar object 6A (first character object) associated with the user 5A (first user) wearing the HMD 120A, the avatar object 6B (second character object) associated with the user 5B (second user) wearing the HMD 120B, and the avatar object 6C associated with the user 5C wearing the HMD 120C are arranged in the same virtual space 11. In such a virtual space 11 shared by a plurality of users, a communication experience, for example, chat with other users via the avatar objects 6A to 6C, can be provided to each user.

In at least one example, each of the avatar objects 6A to 6C is defined as a character object imitating an animal (cat, bear, or rabbit). The avatar objects 6A to 6C include, as parts capable of moving in association with a motion of a user, a head (face direction), eyes (e.g., line of sight and blinking), a face (facial expression), and hands. The head is a part that moves in association with a motion of the HMD 120 detected by the HMD sensor 410 or the like. The eyes are a part that moves in association with the motion and change in line of sight of the eyes of a user detected by the second camera 160 and the eye gaze sensor 140 or the like. The face is a part in which a facial expression determined based on face tracking data, which is described later, is translated. The hands are parts that move in association with the motion of the hands of the user detected by the motion sensor 190 or the like. The avatar objects 6A to 6C each include a body portion and arm portions displayed in association with the head and the hands. Motion control of legs lower than hips is complicated, and hence the avatar objects 6A to 6C do not include legs in at least one embodiment.

Figure 17:
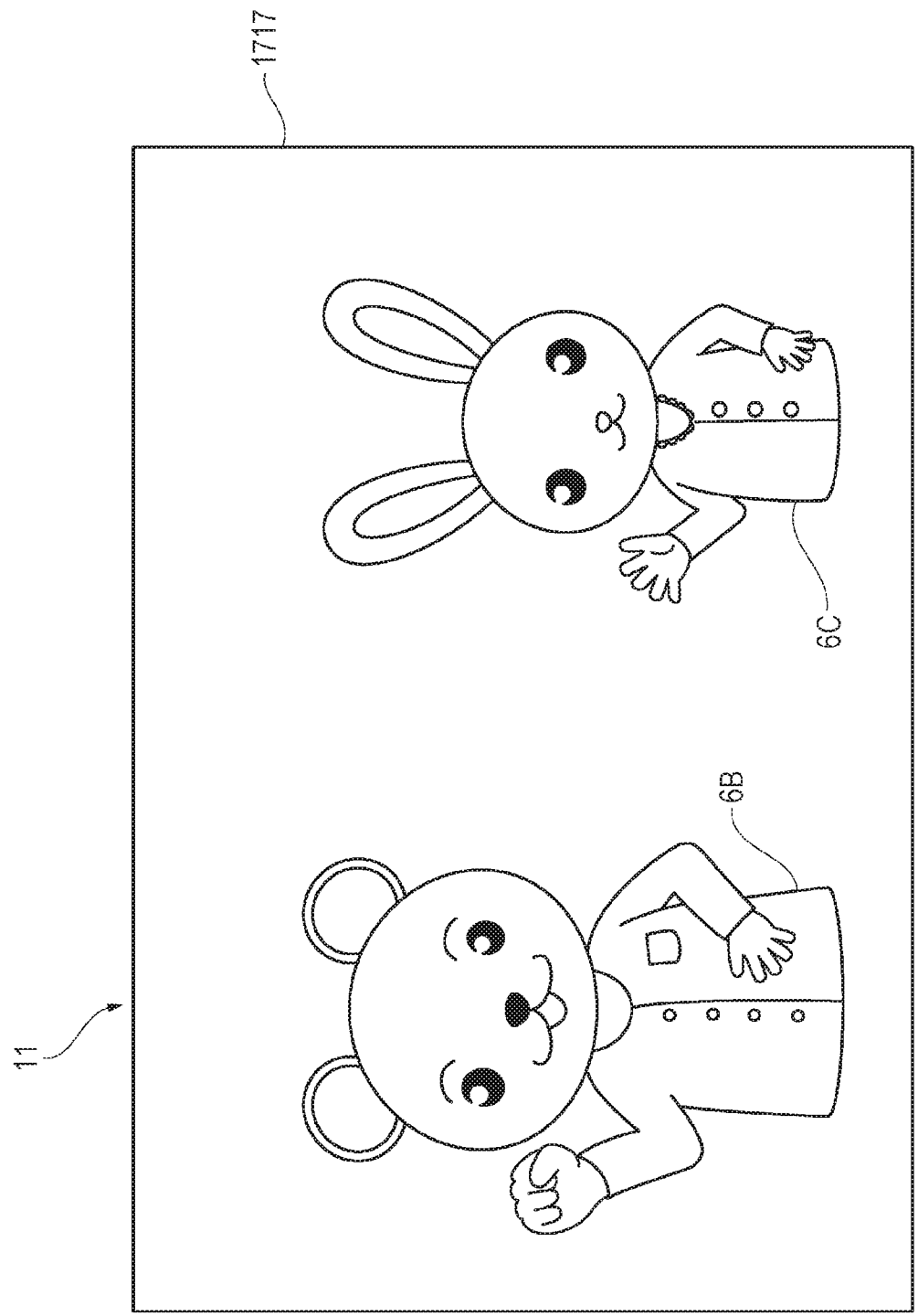
FIG. 17 A diagram of an example of a field-of-view image M to be provided to a user according to at least one embodiment of this disclosure.

The visual field of the avatar object 6A matches the visual field of the virtual camera 14 in the HMD set 110A. As a result, a field-of-view image in a first-person perspective of the avatar object 6A is provided to the user 5A. More specifically, a virtual experience as if the user 5A were present as the avatar object 6A in the virtual space 11 is provided to the user 5A. FIG. 17 is a diagram of an example of a field-of-view image 1717 to be provided to the user 5A via the HMD 120A according to at least one embodiment of this disclosure. A field-of-view image in a first-person perspective of each of the avatar objects 6B and 6C is similarly provided to each of the users 5B and 5C.

[Motion Control of Avatar]

Next, motion control of the avatars is described. As described above, the capability of detecting the above-mentioned motion information differs between the HMD sets 110A and 110C and the HMD set 110B. Specifically, the HMD sets 110A and 110C are capable of detecting all of the above-mentioned direction data, eye tracking data, face tracking data, and hand tracking data. Meanwhile, the HMD set 110B can detect the direction data and the hand tracking data, but does not detect the eye tracking data or the face tracking data. In this case, the player information transmitted from the HMD sets 110A and 110C includes all the types of the above-mentioned motion information, whereas the player information transmitted from the HMD set 110B does not include the eye tracking data or the face tracking data.

In such a case, regarding the avatar objects 6A and 6C of the users 5A and 5C, the motion of the users 5A and 5C can be translated based on all of the types of motion information acquired for the users 5A and 5C. Specifically, the processor 210 is able to change the head direction of the avatar objects 6A and 6C based on the direction data of the users 5A and 5C. The processor 210 is able to change the line of sight of the avatar objects 6A and 6C or cause the avatar objects 6A and 6C to blink based on the eye tracking data of the users 5A and 5C. The processor 210 is able to change the facial expression of the face of the avatar objects 6A and 6C based on the face tracking data of the users 5A and 5C. The processor 210 is able to move the hands of the avatar objects 6A and 6C based on the hand tracking data of the users 5A and 5C.

Meanwhile, regarding the avatar object 6B of the user 5B, because the eye tracking data and the face tracking data are missing from the player information on the user 5B, the motion (facial expression) of the face of the user 5B and the motion (e.g., line of sight and blinking) of the eyes of the user 5B cannot be translated. In response to a difference in type of motion that can be expressed among the avatars due to a difference in capability among the terminals as described above, smooth conversation between the users may become difficult. Therefore, the processor 210 of the HMD set 110 (in this case, HMD set 110A used by user 5A) executes the following motion control of the avatar object 6B.

Figure 18:
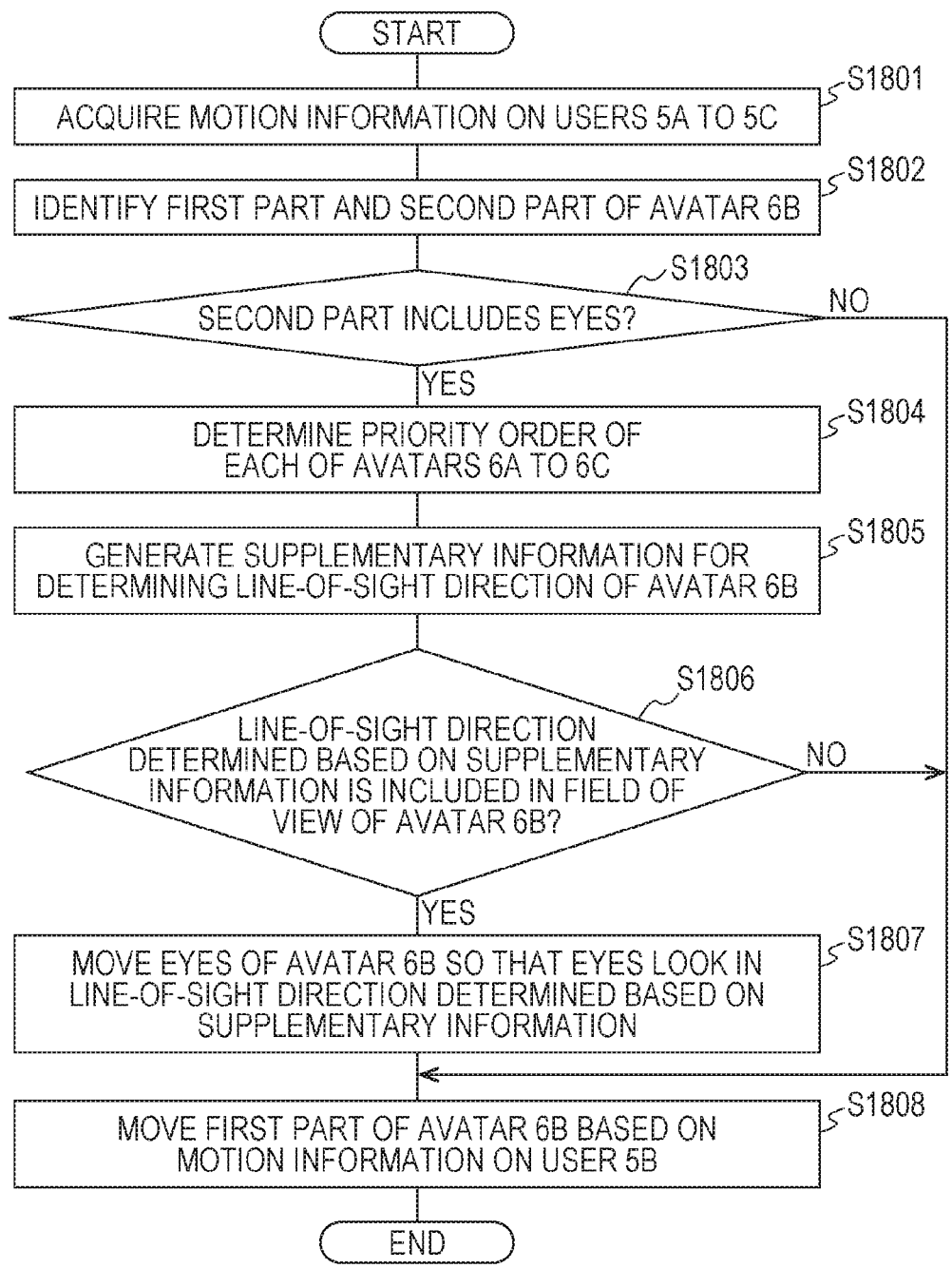
FIG. 18 A flowchart of an example of processing for motion control of an avatar object according to at least one embodiment of this disclosure.

With reference to FIG. 18, there is now described at least one example of the processing for motion control of the avatar object 6B. In FIG. 18 a portion of the processing of Step S1509 of FIG. 15 and Step S1330A of FIG. 13 is described.

In Step S1801, the processor 210 acquires the motion information on each of the users 5A to 5C. For example, the processor 210 extracts the motion information on each of the users 5A to 5C from the player information transmitted from the server 600 after the synchronization processing (Step S1322 of FIG. 13). The motion information on the user 5A may also be acquired at the time of generation of the player information to be transmitted from the HMD set 110A to the server 600 (Step S1321A of FIG. 13). In this case, the processor 210 acquires the direction data, the eye tracking data, the face tracking data, and the hand tracking data of each of the users 5A and 5C, and the direction data and the hand tracking data of the user 5B.

In Step S1802, the processor 210 identifies, of the plurality of parts (head, eyes, face, and hands) of the avatar object 6B, a first part for which information representing the motion of the part of the body of the corresponding user 5B is acquired, and a second part for which information representing the motion of the part of the body of the corresponding user 5B has not been acquired. In this case, information representing the motion of the head and the hands of the user 5B (direction data and hand tracking data) is acquired, and hence the processor 210 identifies the head and the hands of the avatar object 6B as the first part. Meanwhile, the eye tracking data and the face tracking data of the user 5B are not acquired, and hence the processor 210 identifies the eyes and the face of the avatar object 6B as the second part.

In Step S1803, the processor 210 determines whether or not the second part of the avatar object 6B includes the eyes. In this case, the second part of the avatar object 6B includes the eyes (YES in Step S1803), and hence the processor 210 executes the processing of Steps S1804 to S1807, which are described later, in order to move the eyes of the avatar object 6B. Meanwhile, when the second part of the avatar object 6B does not include the eyes (i.e., when the eye tracking data of the user 5B is acquired), the processor 210 skips the processing of Steps S1804 to S1807.

In Step S1804, the processor 210 determines a priority order of each of the avatar objects 6A to 6C associated with the users 5A to 5C, respectively. The priority order of each of the avatars is determined based on, for example, an attribute associated with each of the avatars in advance. The attribute of each of the avatars is stored, for example, in the memory module 530 as a part of the object information 1432. The attribute of each of the avatars is, for example, a level indicating the magnitude of the influence of each avatar, and the role of each avatar (e.g., presenter giving a presentation or the like in the virtual space 11). For example, a role of each avatar in a game determines the influence of the avatar, in at least one embodiment. For example, an avatar having the role of a king has a higher influence than an avatar having the role of a knight. In at least one embodiment, an influence by one avatar over another is determined by the role of each of the avatars. For example, the processor 210 may determine the priority order of each of the avatars such that the priority order is higher when the level is higher. The processor 210 may determine the priority order of each of the avatars based on a priority determined in advance for each role (attribute). The processor 210 may also determine the priority order of each of the avatars such that the priority order is higher in response to the distance from the avatar object 6B in the virtual space 11 being smaller. In this case, as an example, the avatar object 6C, which has the smallest distance to the avatar object 6B, has the highest priority order.

In Step S1805, the processor 210 generates supplementary information for determining the motion (line-of-sight direction) of the eyes, which are a second part of the avatar object 6B. In this case, as an example, the processor 210 generates the supplementary information based on the motion of the eyes or the hands (i.e., eye or hand motion determined based on eye tracking data or hand tracking data of user 5C) of the avatar having the highest priority order determined in Step S1804 (avatar object 6C in this case). For example, the processor 210 identifies a point of interest at the end of the line of sight of the avatar object 6C in the virtual space 11 based on the line-of-sight direction of the avatar object 6C determined from the eye tracking data of the user 5C, and generates information (position information) on that point of interest as supplementary information. For example, in response to an object (e.g., target object such as a bird) being at the end of the line of sight of the avatar object 6C, the processor 210 may determine the coordinates of that object as the point of interest. Meanwhile, in response to no object being at the end of the line of sight of the avatar object 6C, the processor 210 may determine an intersection position between the line of sight of the avatar object 6C and a celestial spherical virtual space image 13 (see FIG. 4) as the point of interest. When the line of sight of the avatar object 6C intersects a reference plane (e.g., ground in virtual space 11) determined in advance, the processor 210 may determine the intersection position as the point of interest.

In Step S1806, the processor 210 determines whether or not the line-of-sight direction determined based on the supplementary information is included in the field of view of the avatar object 6B. In this case, the "line-of-sight direction determined based on the supplementary information" is the line-of-sight direction of the avatar object 6B at the time when the line of sight of the avatar object 6B is directed at the point of interest. Such a line-of-sight direction is determined based on, for example, the position of the eyes of the avatar object 6B and the position of the point of interest. The "field of view of the avatar object 6B" means the range defined based on the direction of the face of the avatar object 6B (direction of the virtual camera 14) and the reference line of sight 16. For example, the processor 210 identifies the field of view (visual field) of the avatar object 6B based on the direction of the face of the avatar object 6B determined from the direction data of the user 5B.

In this case, in response to the line-of-sight direction determined based on the supplementary information not being included in the field of view of the avatar object 6B (e.g., when the line-of-sight direction is the opposite direction to the direction of the face of the avatar object 6B), setting the line-of-sight direction to the line-of-sight direction of the avatar object 6B may cause the eye portion of the avatar object 6B to be in a state of being rolled to show a white portion. Therefore, in response to the line-of-sight direction determined based on the supplementary information not being included in the field of view of the avatar object 6B (Step S1806: NO), the processor 210 skips the processing of Step S1807. Meanwhile, in response to the line-of-sight direction determined based on the supplementary information being included in the field of view of the avatar object 6B (Step S1806: YES), the processor 210 executes the processing of Step S1807.

In Step S1807, the processor 210 moves the eyes of the avatar object 6B so that the eyes look in the line-of-sight direction determined based on the supplementary information (i.e., the line-of-sight direction of the avatar object 6B matches the line-of-sight direction determined based on the supplementary information). As a result, in the virtual space 11, the avatar object 6B is represented in a such manner that the avatar object 6B is looking at the point of interest in the same manner as in the avatar object 6C.

In Step S1808, the processor 210 moves the first part (head and hands) of the avatar object 6B based on the motion information (direction data and hand tracking data) on the user 5B.

The processing flow described above is an example, and the processing procedure of the motion control of the avatar object 6B is not limited to this example. For example, the processor 210 may skip a portion of the above-mentioned steps, or may execute the processing of each of the steps in a different order. Any two or more steps may be combined, or a portion of the steps may be modified or deleted. The processor 210 may also perform other steps in addition to the steps described above.

Figure 19:
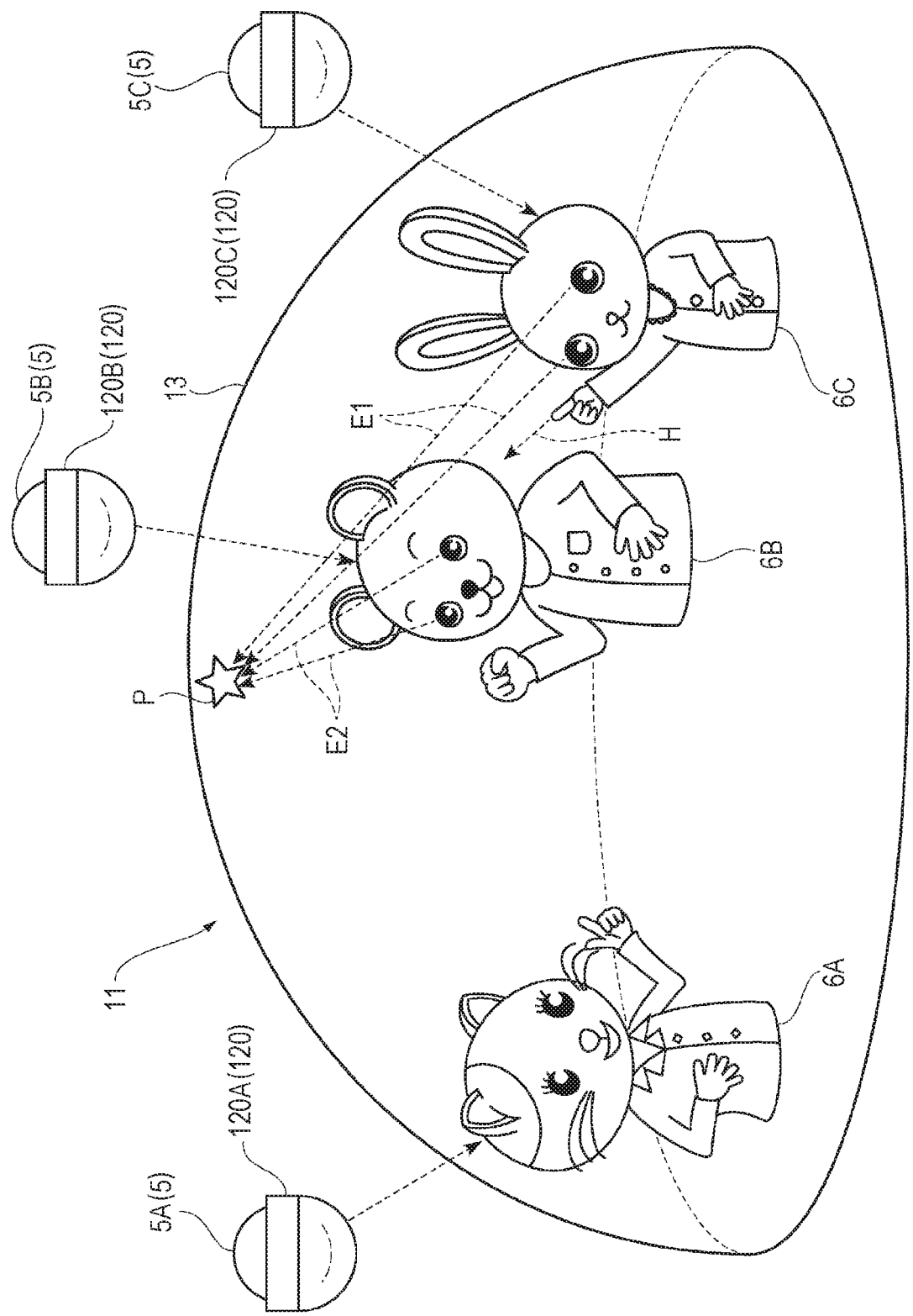
FIG. 19 A diagram of a result of motion control of the avatar object according to at least one embodiment of this disclosure.
Figure 20:
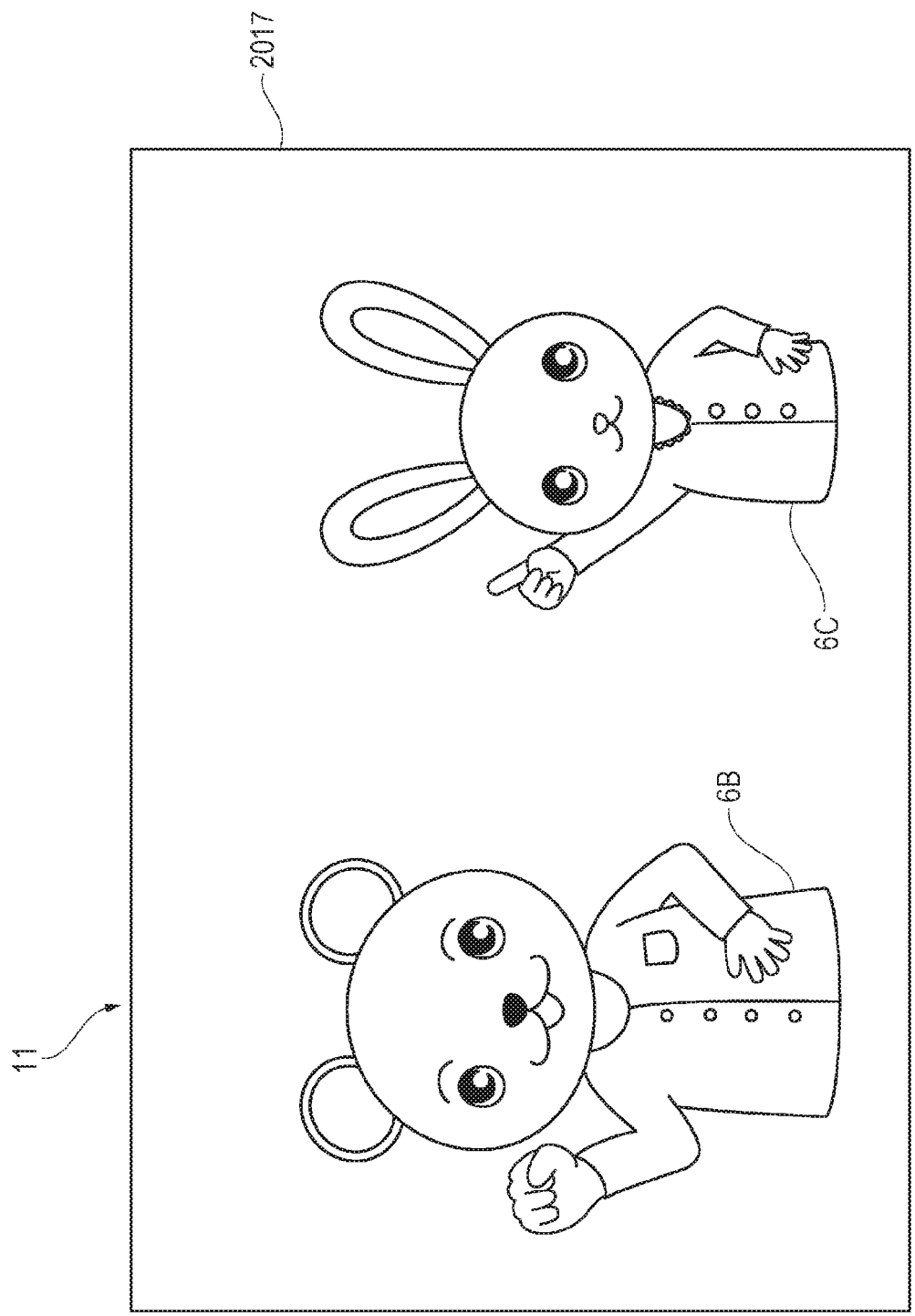
FIG. 20 A diagram of an example of a field-of-view image provided to the user in the virtual space according to at least one embodiment of this disclosure.

FIG. 19 is a diagram of a result of the motion control of the avatar object 6B described above according to at least one embodiment of this disclosure. FIG. 20 is a diagram of an example of a field-of-view image 2017 provided to the user 5A in the virtual space 11 according to at least one embodiment of this disclosure. In the above-mentioned control, in Step S1805, based on a line-of-sight direction E1 of the avatar object 6C (or direction H pointed at by avatar object 6C), the coordinates of an object P (in this case, a star) positioned at the end of the line of sight (or finger) of the avatar object 6C are identified as the point of interest. Then, position information on the point of interest is generated as supplementary information. As a result, in FIG. 19, in Step S1807, the motion of the eyes of the avatar object 6B is controlled so that a line-of-sight direction E2 of the avatar object 6B is directed at the object P. As a result, in FIG. 20, in the field-of-view image 2017 provided to the user 5A, the eyes of the avatar object 6B are represented in a such manner that the eyes are looking up at the object P positioned above in the same manner as in the avatar object 6C.

Next, another example of the motion control of the avatars is described. In the above-mentioned example, the line-of-sight direction of the avatar object 6B is controlled, but a blinking motion of the avatar object 6B may also be controlled. In this case, in place of Steps S1805 and S1806 in FIG. 18, the processor 210 may generate, based on the motion of the eyes of the avatar object 6C having the highest priority order, supplementary information for determining the timing at which the avatar object 6B is to be caused to blink. In place of Step S1807 in FIG. 18, the processor 210 may cause the avatar object 6B to blink at the timing determined based on the supplementary information. For example, the processor 210 calculates a frequency (or average interval) of the blinking by the user 5C (i.e., avatar object 6C) based on the eye tracking data of the user 5C during a predetermined period. Then, the processor 210 may determine the timing for causing the avatar object 6B to blink based on the calculated blinking frequency, for example. The processor 210 may also determine the timing for causing the avatar object 6B to blink after a period of time determined in advance has elapsed after the avatar object 6C blinked. In this case, a natural blinking motion of the avatar object 6B can be implemented based on simple control while eliminating an unnatural motion in which the avatar object 6B and the avatar object 6C blink at exactly the same time.

This concludes descriptions of at least one embodiment of this disclosure. However, the descriptions of at least one embodiment are not to be read as a restrictive interpretation of the technical scope of this disclosure. At least one embodiment is merely given as an example, and it is to be understood by a person skilled in the art that various modifications can be made to at least one embodiment within the scope of this disclosure set forth in the appended claims. The technical scope of this disclosure is to be defined based on the scope of this disclosure set forth in the appended claims and an equivalent scope thereof.

For example, in at least one embodiment, there is described an example in which the motion of the eyes of the avatar object 6B is controlled based on supplementary information. The supplementary information is an alternative to the eye tracking data for the user 5B, which failed to be acquired. However, the part to be controlled is not limited to the eyes. For example, the processor 210 may also control the motion (facial expression) of the face, which is the second part of the avatar object 6B, based on the face tracking data of the user 5C. When the hands are included in the second part of the avatar object 6B, the processor 210 may cause the avatar object 6C to perform a hand motion (e.g., clapping) determined based on the hand tracking data of the user 5C, for example. With such control, the motion in the virtual space 11 of the avatar associated with the user using a terminal (HMD system) having a low capability of detecting the motion information on the user can be made more natural.

In at least one embodiment, there is described an example in which supplementary information for defining the motion of the eyes (in this case, line-of-sight direction), which are the second part, of the avatar object 6B is generated based on the motion of the avatar object 6C having the highest priority order (i.e., motion information on user 5C). However, the supplementary information may also be generated based on motion information on a plurality of users. For example, when a predetermined number or more of avatars sharing the same virtual space 11 are looking at (or pointing at) the same target, the processor 210 may generate position information on the target as the supplementary information. In this case, the motion of the eyes of the avatar object 6B can be controlled based on the idea that there is a high likelihood that the user 5B, for which eye tracking data failed to be acquired, is looking at the same target as the target viewed by the plurality of other users via the avatars.

For example, there maybe a case in which a role (e.g., presenter) in the virtual space 11 is associated with a user instead of an avatar, and the avatar simply functions as a costume. In such a case, in place of determining the priority order among the avatars, the processor 210 may determine the priority order among the users based on the attribute information associated with the user, and generate the supplementary information based on the motion information on a user having a high priority order. In this case, the attribute information associated with the users is stored in the memory module 530 as part of the user information 1433, for example.

The processor 210 may also generate supplementary information for defining the motion of the second part (in this case, eyes) of the avatar object 6B based on the motion information on the first part of the avatar object 6B (i.e., motion information acquired for the user 5B). For example, when the user 5B performs a motion pointing to a specific place, the processor 210 may identify the place being pointed to by the avatar object 6B of the user 5B in the virtual space 11 based on the hand tracking data of the user 5B, and determine the line-of-sight direction of the avatar object 6B so that the line-of-sight direction is directed at the target.

The processor 210 may also acquire motion data determined in advance as the supplementary information. For example, the processor 210 may acquire information on the timing (interval) of a blinking motion determined in accordance with an environmental parameter (e.g., humidity)

associated with the virtual space 11 as supplementary information for defining a blinking motion of the avatar object 6B.

The processing described above relating to the motion control of the avatars (see FIG. 18) maybe executed only for avatars included in the field-of-view image. As a result, processing for controlling avatars not included in the field-of-view image can be omitted in at least one embodiment. Whether or not an avatar is included in the field-of-view image is determined depending on, for example, whether or not the avatar is included in the field-of-view region 15 defined based on the field-of-view direction identified in Step S1506 (see FIG. 15).

The processing relating to the motion control of the avatars (see FIG. 18) maybe executed by the server 600, or may be distributed and executed by the computer 200 (processor 210) and the server 600. For example, in the synchronization processing (Step S1322 of FIG. 13), the server 600 may execute the processing corresponding to Steps S1891 to S1895 of FIG. 18. In this case, the supplementary information for defining the motion of the second part of the avatar object 6B is generated by the server 600, and transmitted to the HMD set 110 of each of the users 5A to 5C. In this way, with the configuration in which the supplementary information is generated by the server 600, the processing for generating the supplementary information by each HMD set 110 can be omitted, and thus the processing amount of each HMD set 110 can be reduced.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a real hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the real hand of the user.

What is claimed is:

1. A method, comprising:
    defining a virtual space, wherein the virtual space comprises a first avatar object associated with a first user, and the first avatar object comprises a first part and a second part different from the first part;
    moving the first avatar object in response to a first input received from the first user, wherein the first input comprises a first motion information for identifying a motion of a part of a body of the first user, and the first part of the first avatar object is moved in accordance with the first motion information;
    acquiring supplementary information for defining a motion of the second part, wherein the supplemental information is independent of a detected movement of the first user;
    moving the second part based on the supplementary information;
    identifying a visual field in the virtual space of a second user different from the first user; and
    generating a visual-field image for display to the second user corresponding to the visual field.

2. The method according to claim 1, wherein the virtual space further comprises a third avatar object associated with a third user,
    wherein the method further comprises:
        moving the third avatar object in response to a third input received from the third user.

3. The method according to claim 2, further comprising generating the supplementary information based on at least one of a second motion information based on a detected movement of the second user or on a third motion information based on a detected movement of the third user.

4. The method according to claim 3, further comprising:
    determining a priority order of each of the second user and the third user; and
    generating the supplementary information based on the second motion information in response to the second user having a higher priority than the third user.

5. The method according to claim 2, further comprising:
    detecting a motion of an eye of the third user;
    generating the supplementary information for determining a line of sight of the first avatar object based on the detected motion of the eye of the third user; and
    moving the eye of the first avatar object based on the supplementary information so that a line of sight of the eye of the first avatar object matches the determined line of sight.

6. The method according to claim 5, wherein the first part comprises a direction of a face of the first avatar object, and
    wherein the method further comprises:
        identifying a field of view of the first avatar object based on the direction of the face;
        moving, when the line of sight determined based on the supplementary information is included in the field of view, the eye of the first avatar object so that the line of sight of the eye matches the determined line of sight.

7. The method of claim 6, further comprising
    avoiding moving, in response to the line of sight determined based on the supplementary information being outside of the field of view, the eye of the first avatar object.

8. The method according to claim 2, further comprising:
    detecting a motion of a hand of the third user;
    generating the supplementary information based on the detected motion of the hand of the third user; and
    moving the hand of the first avatar object based on the supplementary information so that movement of the hand of the first avatar object matches the detected motion of a hand of the third avatar object.

9. The method according to claim 2, wherein the second part comprises an eye of the first avatar object, and
    wherein the method further comprises:
        generating the supplementary information for determining a timing to cause the first avatar object to blink based on at least one of the a detected blinking motion of the second user or a detected blinking motion of the third user; and
        causing the first avatar object to blink based on the supplementary information.

10. The method according to claim 9, wherein the causing the first avatar object to blink comprises preventing the first avatar object from blinking at a same time as the third avatar object.

11. A method, comprising:
defining a virtual space, wherein the virtual space comprises a plurality of avatar objects, wherein each avatar object of the plurality of avatar objects is associated with a corresponding user, and a first avatar object of the plurality of avatar objects comprises a first part and a second part;
detecting movement of a first user associated with the first avatar object;
moving the first part of the first avatar object in the virtual space in response to the detected movement of the first user;
detecting movement of a second user associated with a second avatar object of the plurality of avatar objects;
generating supplemental information based on the detected movement of the second user; and
moving the second part of the first avatar object in the virtual space based on the supplemental information.

12. The method according to claim 11, wherein the second part of the first avatar object comprises an eye of the first avatar object.

13. The method according to claim 11, wherein the second part of the first avatar object comprises a hand of the first avatar object.

14. The method according to claim 11, wherein the generating of the supplemental information comprises generating the supplemental information based on the detected movement of the second user and based on detected movement of a third user corresponding to a third avatar object of the plurality of avatar objects.

15. The method according to claim 14, further comprising:
determining a priority between the second user and the third user, wherein the moving of the second part of the first avatar object comprises moving the second part of the first avatar object based on the detected movement of the user having a highest priority.

16. The method according to claim 15, wherein the determining the priority is based on a distance between the first avatar object and each of the second avatar object and the third avatar object, wherein the highest priority is assigned to a closest avatar object of the second avatar object and the third avatar object.

17. The method according to claim 15, wherein the determining the priority is based on a role of the second user and the third user.

18. A system comprising:
a non-transitory computer readable medium configured to store instructions thereon; and
a processor connected to the non-transitory computer readable medium, wherein the processor is configured to execute the instructions for:
defining a virtual space, wherein the virtual space comprises a first avatar object associated with a first user, and the first avatar object comprises a first part and a second part different from the first part;
moving the first avatar object in response to a first input received from the first user, wherein the first input comprises a first motion information for identifying a motion of a part of a body of the first user, and the first part of the first avatar object is moved in accordance with the first motion information;
acquiring supplementary information for defining a motion of the second part, wherein the supplemental information is independent of a detected movement of the first user;
moving the second part based on the supplementary information;
identifying a visual field in the virtual space of a second user different from the first user; and
generating a visual-field image for display to the second user corresponding to the visual field.

19. The system according to claim 18, wherein the processor is further configured to execute the instructions for:
defining the virtual space further comprising a third avatar object associated with a third user; and
moving the third avatar object in response to a third input received from the third user.

20. The system according to claim 19, wherein the processor is further configured to execute the instructions for:
generating the supplementary information based on at least one of a second motion information based on a detected movement of the second user or on a third motion information based on a detected movement of the third user.

* * * * *